US007654574B2

(12) United States Patent
Haynes

(10) Patent No.: US 7,654,574 B2
(45) Date of Patent: **\*Feb. 2, 2010**

(54) APPARATUS AND METHOD FOR MOUNTING MUD FLAPS ON A VEHICLE

(76) Inventor: Norman Anthony Haynes, 7124 Red Lake Ct., Indianapolis, IN (US) 46217

( * ) Notice: Subject to any disclaimer, the term of this patent is extended or adjusted under 35 U.S.C. 154(b) by 0 days.

This patent is subject to a terminal disclaimer.

(21) Appl. No.: 11/758,589

(22) Filed: Jun. 5, 2007

(65) Prior Publication Data

US 2007/0267858 A1 Nov. 22, 2007

Related U.S. Application Data

(63) Continuation-in-part of application No. 10/988,063, filed on Nov. 13, 2004, now Pat. No. 7,226,086.

(60) Provisional application No. 60/520,593, filed on Nov. 17, 2003, provisional application No. 60/511,385, filed on Oct. 15, 2003.

(51) Int. Cl.
*B62D 25/18* (2006.01)
(52) U.S. Cl. .................. 280/851; 280/154; 280/847
(58) Field of Classification Search .......... 280/154.5 R, 280/152.3, 159, 160, 847–849, 851, 154; 180/84; 296/198
See application file for complete search history.

(56) References Cited

U.S. PATENT DOCUMENTS 1,411,254 A    4/1922   Braucci
1,954,918 A    4/1934   Gregory
2,683,612 A    7/1954   Bacino
2,714,015 A    7/1955   Sherman (Continued)

FOREIGN PATENT DOCUMENTS

BE              493696        6/1950

(Continued)

*Primary Examiner*—S. Joseph Morano
*Assistant Examiner*—Vaughn T Coolman
(74) *Attorney, Agent, or Firm*—R. Randall Frisk

(57) ABSTRACT

A mud flap mounting system for connecting a mud flap to a mud flap mounting bracket of a vehicle includes a mud flap group and a mud flap mounting assembly for connecting one mud flap of the mud flap group to a vehicle mud flap mounting bracket. The mud flap group includes at least two mud flaps, each comprising a sheet of flexible material having a top edge and defining at least two mounting openings, each mounting opening including a bolt hole, a first slit and at least a second slit, said first slit being a severed portion of the sheet with virtually no loss of material and extending from the top edge to the corresponding bolt hole, and the at least a second slit extending outwardly from the bolt hole. The mud flap mounting assembly includes a pressure plate, a spring member, a bolt with a head and a shank with a distal end, and a tightening member. The shank extends through the pressure plate, mud flap, bracket, and spring member, and the tightening member engages at the distal end of the shank to compress the pressure plate, mud flap, bracket and spring member between the bolt head and the tightening member. Each mud flap of the mud flap group bears at least one of indicia and an image.

15 Claims, 17 Drawing Sheets

U.S. PATENT DOCUMENTS

| | | |
|---|---|---|
| 2,809,848 A | 10/1957 | Carswell |
| 2,826,428 A | 3/1958 | Lincoln |
| 2,865,655 A | 12/1958 | Boysen |
| 2,935,336 A | 5/1960 | Case |
| 3,051,508 A | 8/1962 | Federspiel |
| 3,095,215 A | 6/1963 | Black |
| 3,158,386 A | 11/1964 | Tillinghast |
| 3,219,363 A | 11/1965 | Dalsey |
| 3,248,126 A | 4/1966 | Sexton et al. |
| 3,258,887 A | 7/1966 | Mostoller |
| 3,285,624 A | 11/1966 | Aber |
| 3,333,868 A | 8/1967 | Sogoian |
| 3,632,137 A | 1/1972 | Jossy |
| 3,700,260 A | 10/1972 | Moore et al. |
| 3,711,119 A | 1/1973 | Hollingsworth |
| 3,726,544 A | 4/1973 | Miller |
| 3,778,086 A | 12/1973 | Moore |
| 3,782,757 A * | 1/1974 | Juergens .................. 280/851 |
| 3,822,897 A | 7/1974 | Heath |
| 3,899,193 A * | 8/1975 | Evans ..................... 280/851 |
| 3,940,165 A | 2/1976 | Sogoian |
| 4,180,230 A | 12/1979 | Sogoian |
| 4,856,816 A | 8/1989 | Francis |
| 5,044,667 A | 9/1991 | Manning |
| 5,460,412 A | 10/1995 | Vincent |
| 5,486,079 A | 1/1996 | Martin |
| 5,562,296 A | 10/1996 | Hall et al. |
| 5,829,786 A | 11/1998 | Dahl |
| 5,915,708 A | 6/1999 | Silva |
| 5,967,553 A | 10/1999 | Cominsky |
| 6,116,628 A | 9/2000 | Adrian |
| 6,527,288 B2 * | 3/2003 | Abercrombie ............. 280/154 |
| 7,226,086 B2 * | 6/2007 | Haynes .................... 280/851 |
| 2005/0212282 A1 * | 9/2005 | Markham ................. 280/851 |

FOREIGN PATENT DOCUMENTS

| | | |
|---|---|---|
| GR | 604068 | 6/1948 |

* cited by examiner

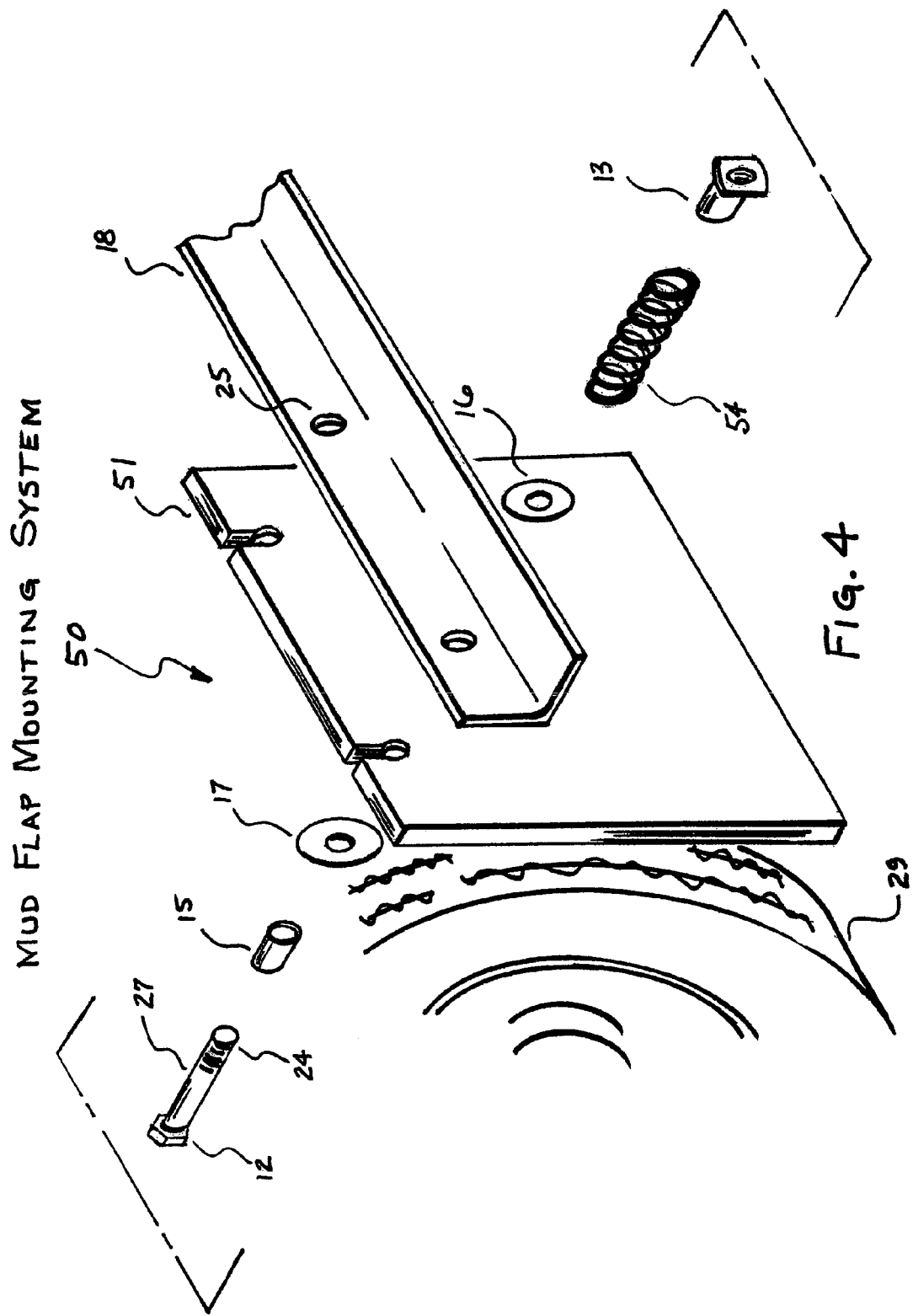

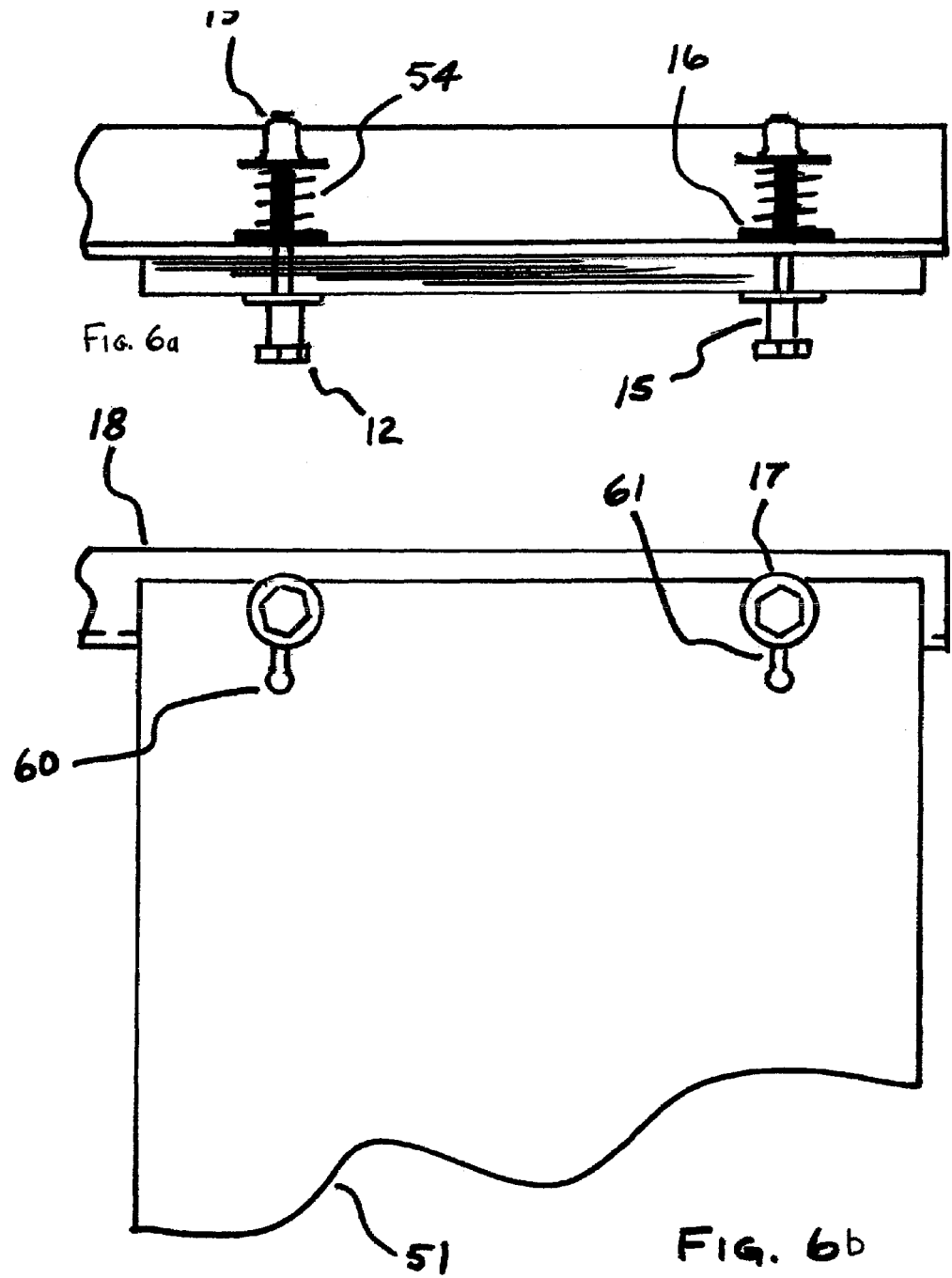

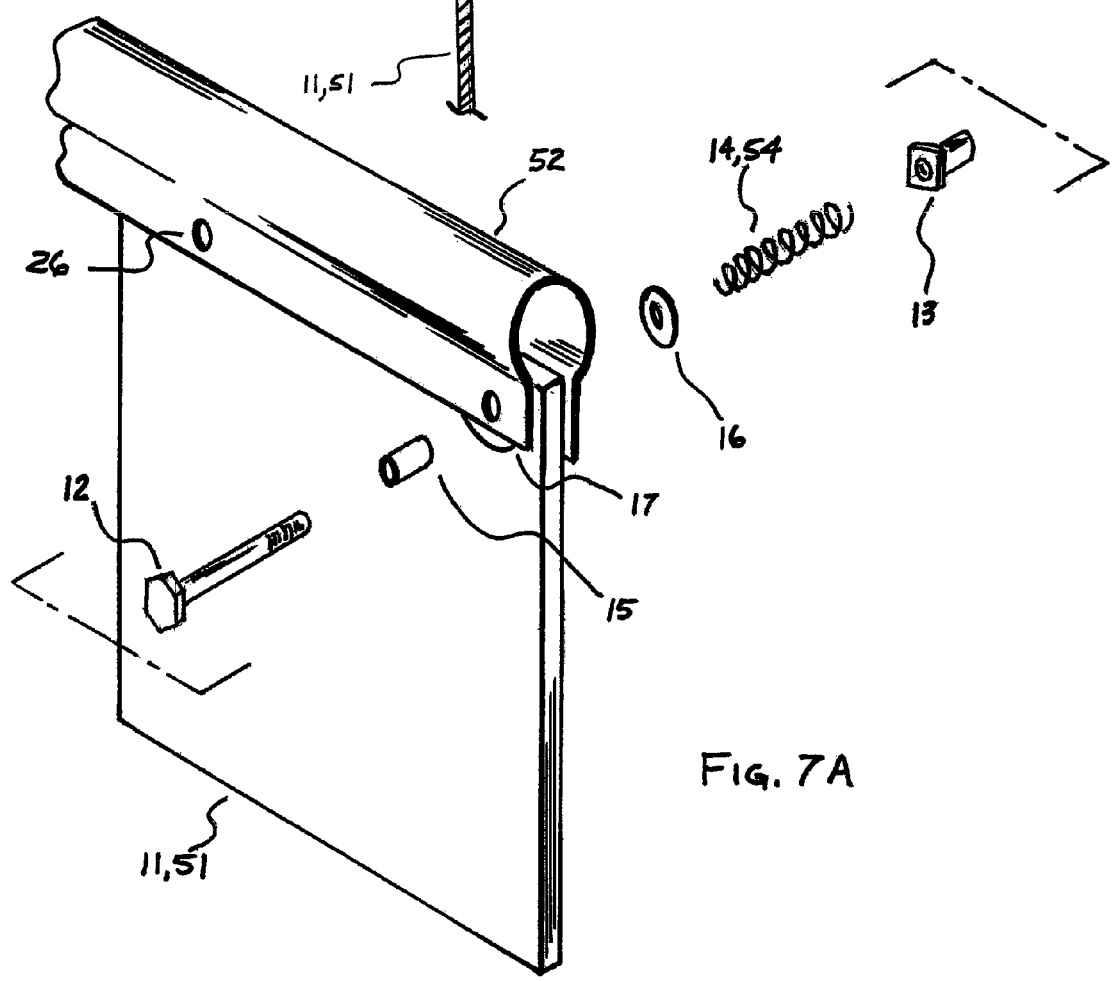

14,54

14,54

14,54

14,54

APPARATUS AND METHOD FOR MOUNTING MUD FLAPS ON A VEHICLE

REFERENCE TO RELATED APPLICATIONS

This application is a continuation-in-part of U.S. application Ser. No. 10/988,063 filed Nov. 13, 2004 now U.S. Pat. No. 7,226,086, which claims priority from U.S. Provisional Applications Nos. 60/520,593 filed Nov. 17, 2003 and 60/511,385 filed Oct. 15, 2003.

FIELD OF THE INVENTION

The present invention relates to the field of vehicle mud flaps and, more particularly, to a method and apparatus for mounting mud flaps on a vehicle such as a truck or semi-tractor/trailer.

BACKGROUND OF THE INVENTION

Many jurisdictions require large vehicles such as trucks and semi-tractor/trailers to have mud flaps, which are sheets of flexible material mounted on the vehicle to hang down a short distance behind at least one of the vehicle's wheels. Typically, the mud flap is secured to a mounting bracket, which is secured to the vehicle chassis. Failure and detachment of the mud flap can occur, however, when the vehicle is being backed up and the mud flap becomes pinched between one of the tires and a curb or other obstruction. The sudden jerk often tears a portion or all of the mud flap from its mounting bracket or bends or completely ruins the mounting bracket.

A number of mud flap mounting arrangements and mounting hardware designs are shown in the following U.S. and foreign patents:

| Patent No. | Inventor |
|---|---|
| 2,683,612 | Bacino |
| 2,714,015 | Sherman |
| 2,809,848 | Carswell |
| 2,826,428 | Lincoln |
| 2,865,655 | Boysen |
| 2,935,336 | Case |
| 3,052,508 | Federspiel |
| 3,095,215 | Black |
| 3,158,386 | Tillinghast |
| 3,219,363 | Dalsey |
| 3,248,126 | Sexton et al. |
| 3,258,887 | Mostoller |
| 3,285,624 | Aber |
| 3,333,868 | Sogoian |
| 3,700,260 | Moore et al. |
| 3,711,119 | Hollingsworth |
| 3,726,544 | Miller |
| 3,778,086 | Moore |
| 3,822,897 | Heath |
| 3,940,165 | Sogoian |
| 4,180,230 | Sogoian |
| 4,856,816 | Francis |
| 4,044,667 | Manning |
| 5,460,412 | Vincent |
| 5,486,079 | Martin |
| 5,915,708 | Silva |
| 5,967,553 | Cominsky |
| 6,116,628 | Adrian |
| BE493696 | |
| GR604068 | |
| IT321968 | |

What is needed is an improved mud flap system.

SUMMARY OF THE INVENTION

The object of the present invention is to provide an economical and practical means of reducing repair and downtime costs incurred when a mud flap is accidentally pinched between a rotating tire and a curb or other obstruction while backing up the vehicle. By using mud flaps with slit or slotted mounting holes and a spring activated pressure plated to hold the mud flap in their service position, a "weakest link" scenario is created at the mud flap mounting points, producing the desired releaseability function. The same mud flap can then be reinstalled easily in a short length of time on the undamaged mud flap mounting bracket.

A mud flap mounting system for connecting a mud flap to a mud flap mounting bracket of a vehicle includes a mud flap group and a mud flap mounting assembly for connecting one mud flap of the mud flap group to a vehicle mud flap mounting bracket. The mud flap group includes at least two mud flaps, each comprising a sheet of flexible material having a top edge and defining at least two mounting openings, each mounting opening including a bolt hole, a first slit and at least a second slit, said first slit being a severed portion of the sheet with virtually no loss of material and extending from the top edge to the corresponding bolt hole, and the at least a second slit extending outwardly from the bolt hole. The mud flap mounting assembly includes a pressure plate, a spring member, a bolt with a head and a shank with a distal end, and a tightening member. The shank extends through the pressure plate, mud flap, bracket, and spring member, and the tightening member engages at the distal end of the shank to compress the pressure plate, mud flap, bracket and spring member between the bolt head and the tightening member. Each mud flap of the mud flap group bears at least one of indicia and an image.

It is an object of the present invention to provide an improved mud flap mounting system.

Other objects and advantages of the present invention will become apparent from the following description of the preferred embodiment.

BRIEF DESCRIPTION OF THE DRAWINGS

FIG. 4 is an isometric, exploded view of a mud flap mounting system 50 in accordance with another embodiment of the present invention.

FIGS. 6a and 6b are front and top views of mud flap 51 of FIG. 5, illustrating the dynamics of the releaseability function.

FIGS. 7A, 7B, 8A and 8B show exploded and end views of the mud flap mounting system 10 when used with typical contemporary mud flap mounting bracket designs in accordance with the present invention.

DESCRIPTION OF THE PREFERRED EMBODIMENT

Figure 1:
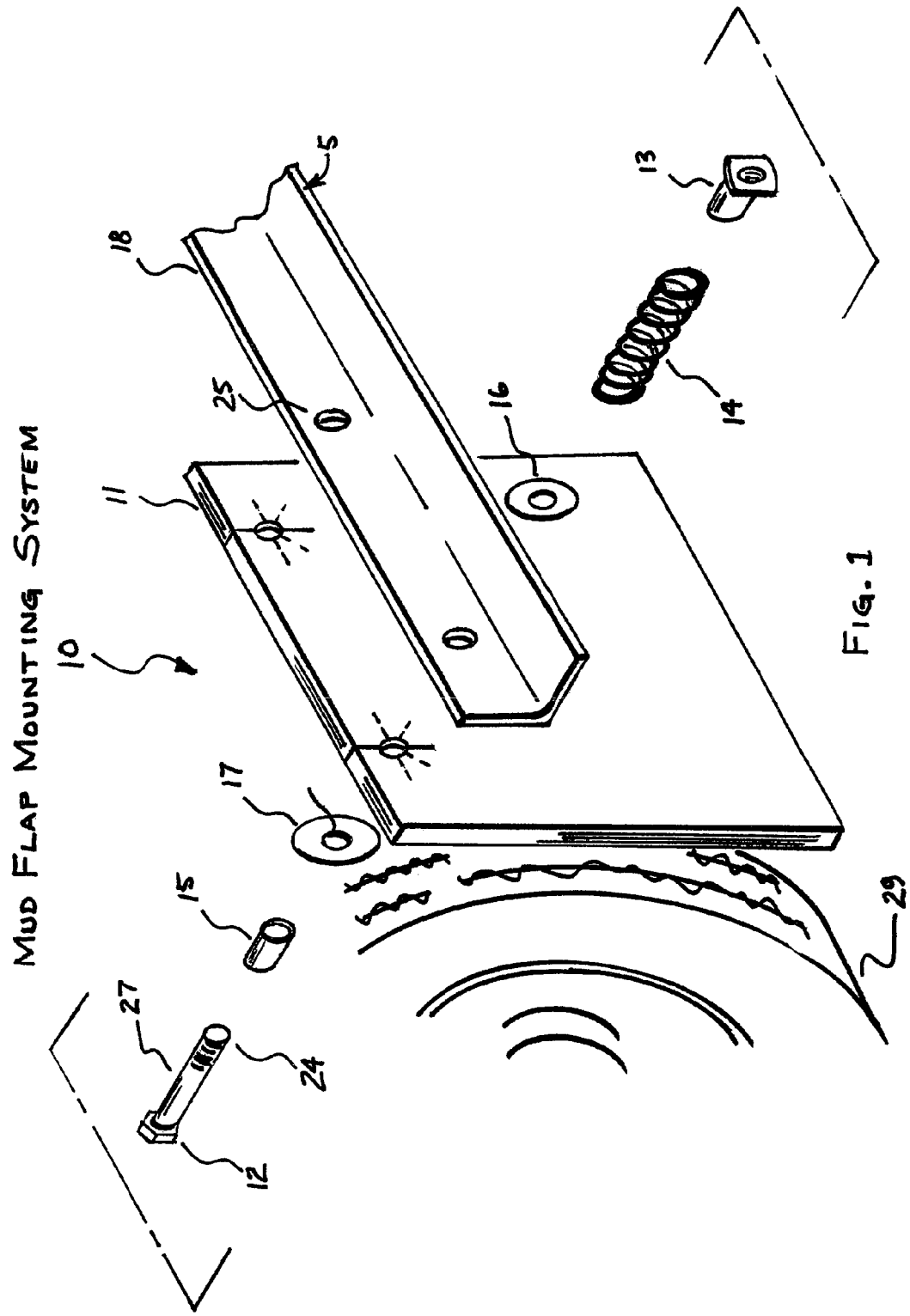
FIG. 1 is an isometric exploded view of a mud flap mounting system 10 in accordance with one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, and that any alterations or modifications in the illustrated device, and any further applications of the principles of the invention as illustrated therein are contemplated as would normally occur to one skilled in the art to which the invention relates.

Figure 2:
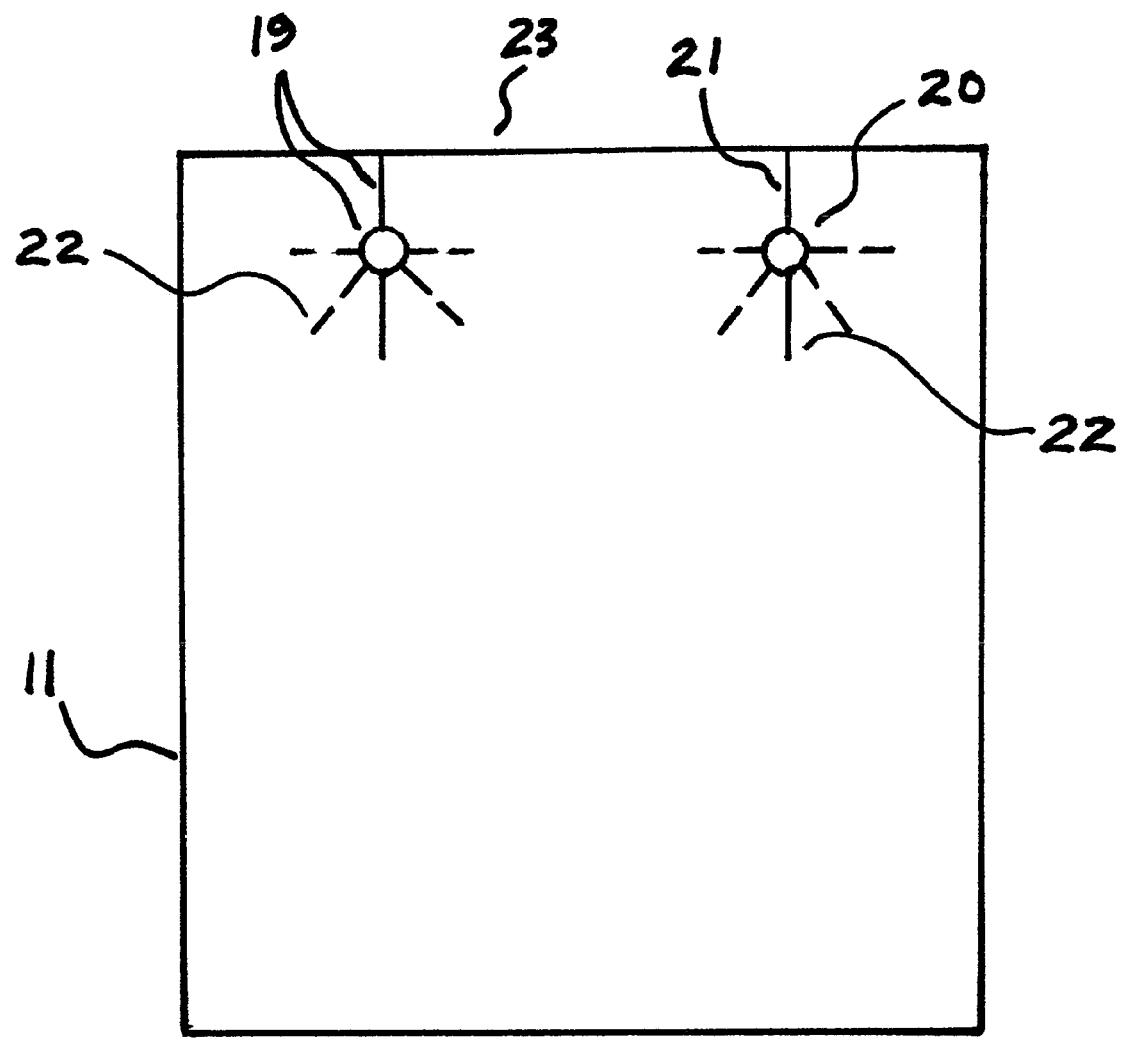
FIG. 2 is a front, elevational view of a mud flap 11 of mud flap mounting system 10 of FIG. 1.
Figures 3A, 3B:
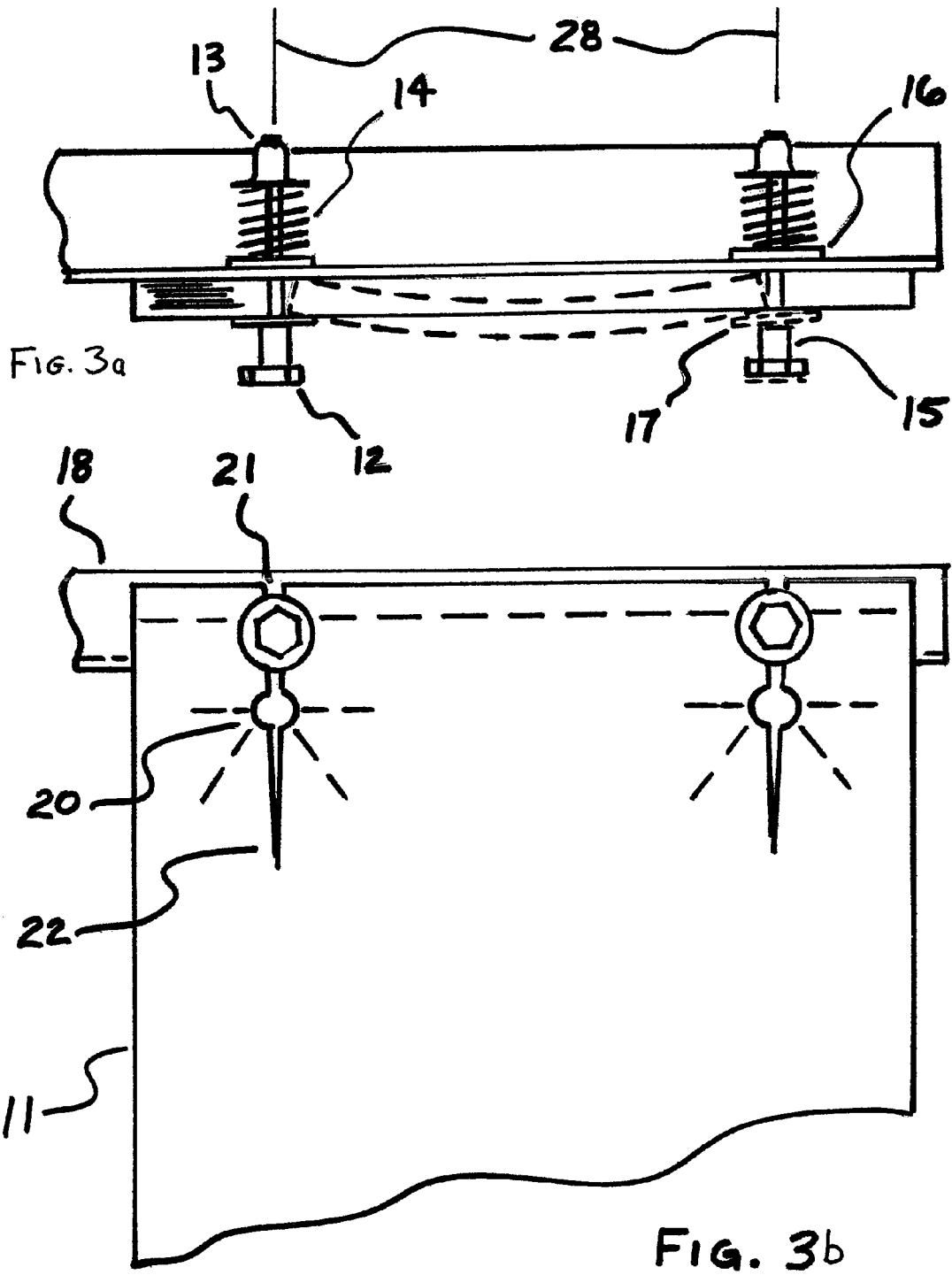
FIGS. 3a and 3b are top and front views of mud flap 11 of FIG. 2, illustrating the dynamics of the releaseability function.

Referring to FIGS. 1 and 2, there is shown a mud flap mounting system 10 in accordance with one embodiment of the present invention. Mounting system 10 generally includes a mud flap 11, a bolt 12, a tightening member 13, a spring member 14 and a pressure plate 17. Mounting system 10 may also include a spacer 15 and a washer 16. Mounting system 10 is configured to connect with a mounting bracket 18 of a vehicle (such as truck or semi-tractor/trailer and represented generally at 5). A "vehicle" as described herein is intended to include trucks, semi-tractors and semi-trailers, all of which having a mud flap mounting bracket. The mud flap mounting bracket is any structure at the rear of such vehicles that has at least a portion that is configured for receipt of one or more mud flaps. As with known mud flaps, mud flap 11 is generally a rectangular sheet of rubber or plastic, but may comprise any appropriate material that is somewhat flexible, but sufficiently rigid, in combination with its thickness and weight, to stay hanging downward when subjected to wind forces while the vehicle is moving at generally accepted highway speeds. At the top edge 23 of mud flap 11 are defined at least two mounting holes 19. Each mounting hole 19 includes a main bolt hole 20, a first slit 21 and at least a second slit 22. The main bolt hole 20 is defined proximal, but down a first distance down from top edge 23. First slit 21 extends down from top edge 23 to its corresponding main bolt hole 20. The second slit 22 (or slits 22) extend outwardly from main bolt hole 20. As shown in FIGS. 1 and 2, the second slit(s) 22 extends radially from main bolt hole 20, but alternative embodiments are contemplated wherein one or more second slits extend outwardly, but not radially outwardly. Also as shown in FIGS. 1 and 2, the second slit(s) are contemplated to extend from main bolt hole 20 at an angle that is between 180 degrees (solid line slit) and 90 degrees (dashed line slits shown parallel to top edge 23) relative to first slit 21. Thus, in the embodiment of FIG. 2, mounting holes 19 include vertical first slit 19 and five additional second slits 22 that are roughly 90 degrees, 135 degrees and 180 degrees from first slit 21. Also, first slit 20 is contemplated to extend roughly 90 degrees downwardly relative to top edge 23, but it may extend with some slight angle relative thereto.

Bolt 12 has a main shank and a threaded distal end 24. Tightening member 13 is a flanged nut, which enables tightening and loosening by hand, and spring 14 is a coil spring. Spacer 15 is generally cylindrical with a central hole sized and configured to accept extend bolt 12 therethrough. Spacer 15 has an axial length L that is at least as great as the diameter $D_1$ of bolt shank 27. It is preferred that L be between $D_1$ and $3D_1$, and optimally that L be about equal to $2D_1$. Alternative embodiments are contemplated wherein the outer shape of spacer 15 is other than round, such as and without limitation, rectangular, hexagonal, or other nonsymmetrical shape. Pressure plate 17 is any, generally flat member with a central hole 33. Hole 33 is large enough to receive bolt shank 27 therethrough, but is smaller than the diameter of spacer 15 so that spacer 15 can bear against pressure plate 17. The diameter of pressure plate 17 is sufficiently large to remain generally flat against mud flat 11 in the event bolt 12 and spacer 15 are rocked off their axis and against pressure plate 17. It is preferred that $D_2$ is between about 2.5 and 4.0 times greater than $D_1$ and in one embodiment, $D_2$ is 3 times $D_1$.

In assembly, with mud flap 11 positioned against mounting bracket 18 so that main bolt holes 20 are aligned with complementary holes 25 defined in mounting bracket 18, each bolt 12 extends, in order, through a spacer 15, a pressure plate 17, a main bolt hole 20, a hole 25 in the bracket 18, and then through a washer 16, and spring member 14, and finally, flanged nut 13 is screwed onto the threaded end 24 of nut 12. Tightening threaded flanged nut 13 onto bolt 12 draws nut 13, and compresses spring member 14 between washer 16 and nut 13, and brings the head of nut 12 fairly tight against spacer 15. Spring 14 is thus in compression. The spring constant of spring 14 and the percentage reduction of its length (i.e. the resulting compressing force) is selected by the user to facilitate ease of assembly, to resist vibrational unscrewing of tightening member 13 and, most importantly, to provide optimum non-damaging release action of mud-flap 11.

In operation, the dynamics of the releaseability function of mounting system 10 provides that the axial force of spring member 14 combines with the frictional forces of the mounting system 10 components (e.g. nut 13, spring 14) to resist nut 13 from unscrewing by itself under normal vehicle movement, and keeps mud flap 11 relatively tight, in a substantially vertical plane, up against mounting bracket 18. When the mud flap 11 is pinched between a rotating tire 29 and a curb or other obstruction while backing up the vehicle 5, the resultant extremely high instantaneous jerk on mud flap 11 causes the shank 27 of the mounting bolts 12 to act as a cam to spread one or more of the mud flap 11 slits 21 and 22 apart, distorting mud flap 11 within the space 28 between bolt holes 20, creating a retreating axial movement of pressure plates 17 and bolts 12 to release mud flap 11 from its mounting bracket 18. To remount mud flap 11, the tightening members 13 are unscrewed by hand, without the aid of tools. Spring members 14 and washers 16 are removed. Bolts 12 with spacer 15 and pressure plate 17 are retracted from the mud flap mounting bracket 18. The mud flap 11 is repositioned against mounting bracket 18, and bolts 12 with spacer 15 and pressure plate 17 are inserted through mounting holes 20, mounting bracket holes 25, washer 16, and spring members 14. Tightening members 13 are replaced and adjusted by hand to their original or desired setting.

Figure 5:
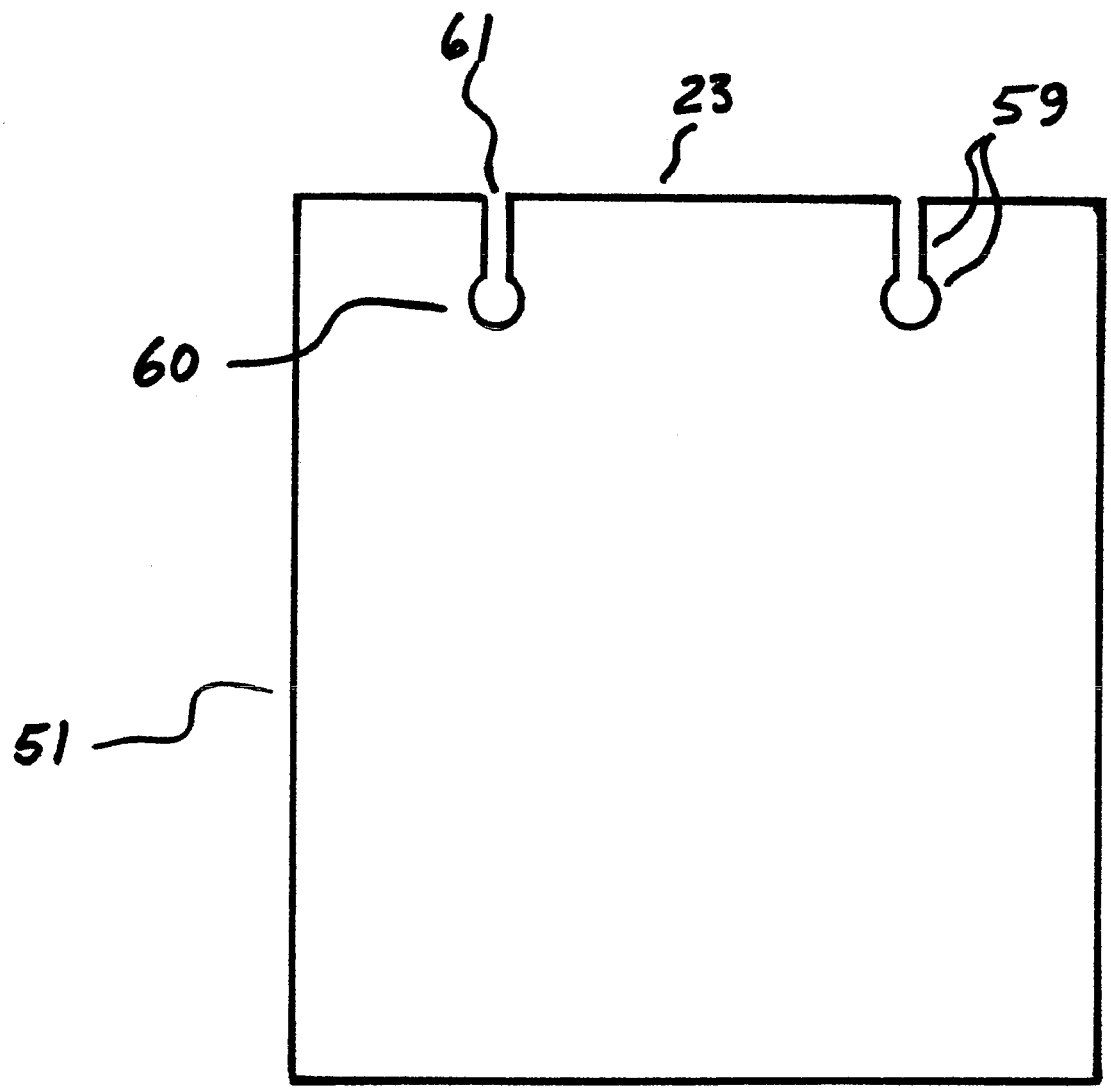
FIG. 5 is front, elevational view of a mud flap 51 of the mud flap mounting system 50 of FIG. 4.
Figure 8B:
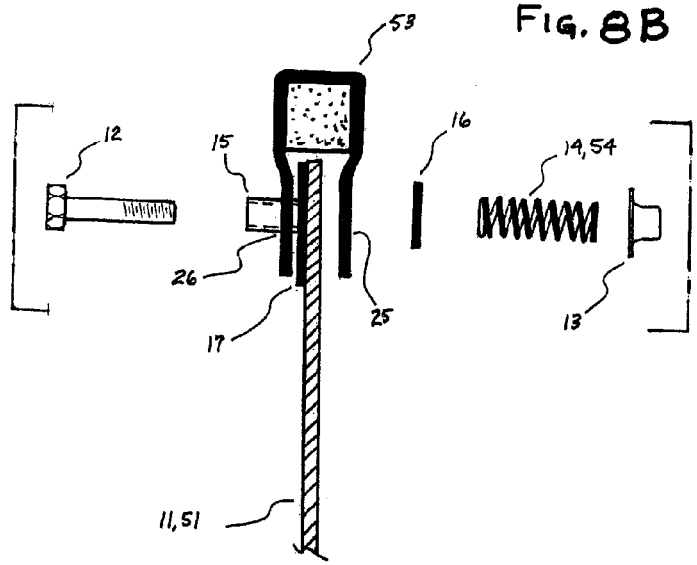
Figure 8A:
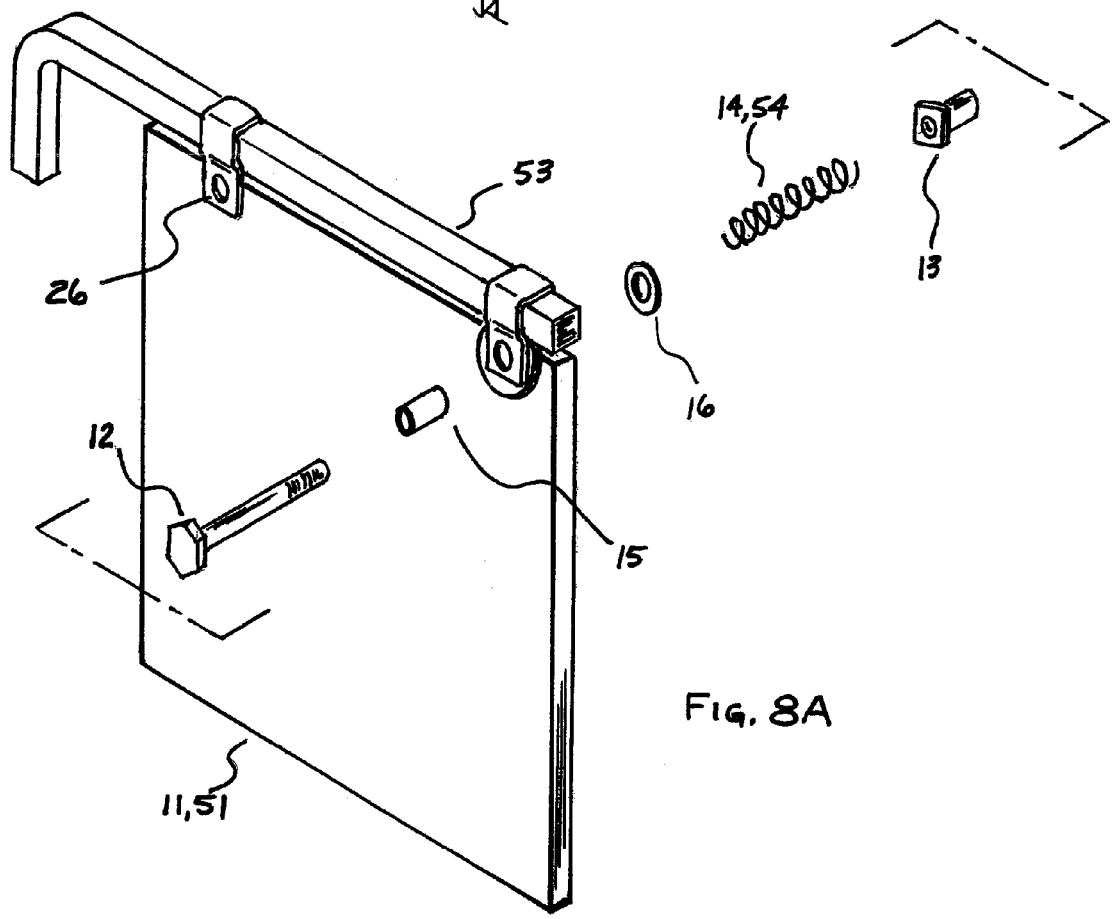
Figures 9A, 9B:
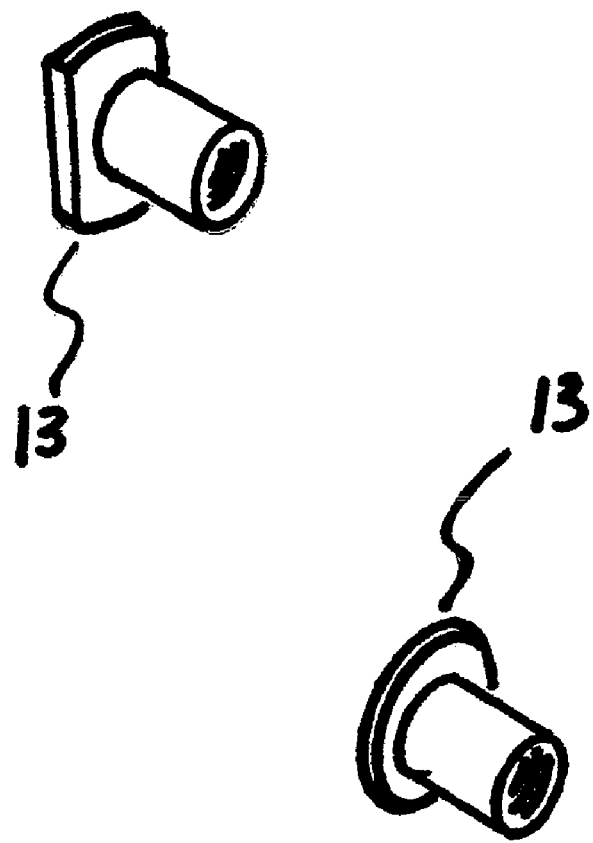
FIGS. 9A and 9B show alternative weld nut tightening member designs in accordance with the present invention.
Figure 10A:
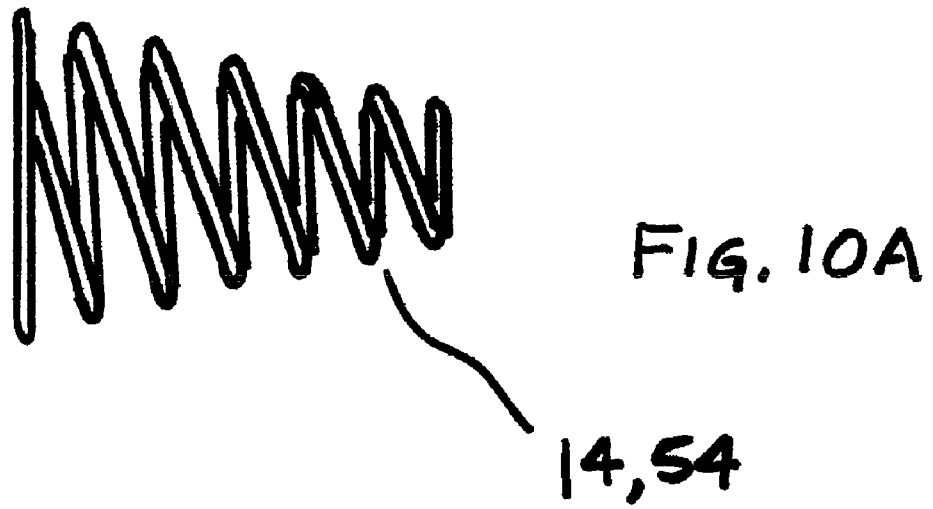
FIGS. 10A, 10B, 10C, 10D, 10E and 10F show alternative spring member designs in accordance with the present invention
Figure 10B:
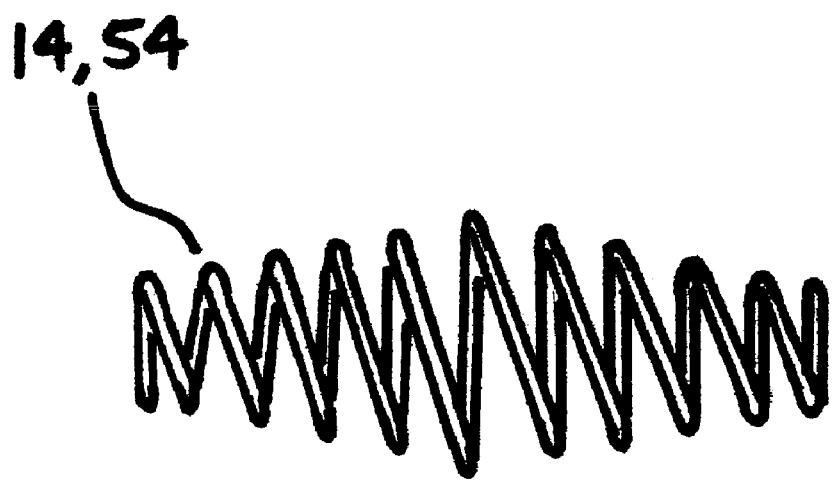
Figures 10C, 10D:
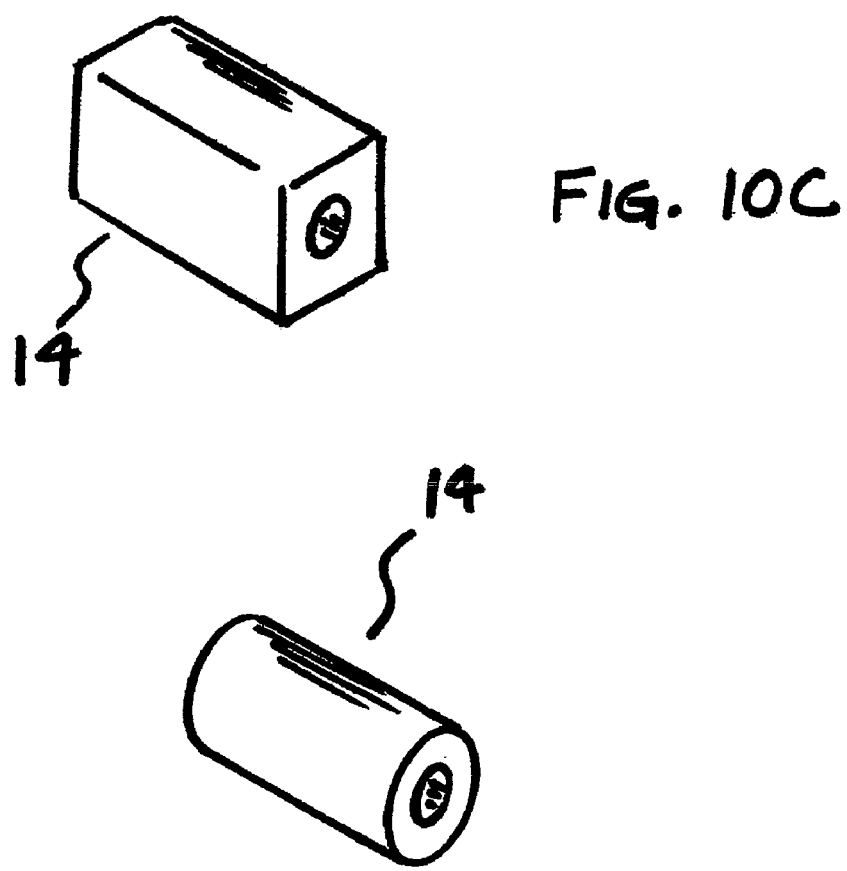
Figure 10E:
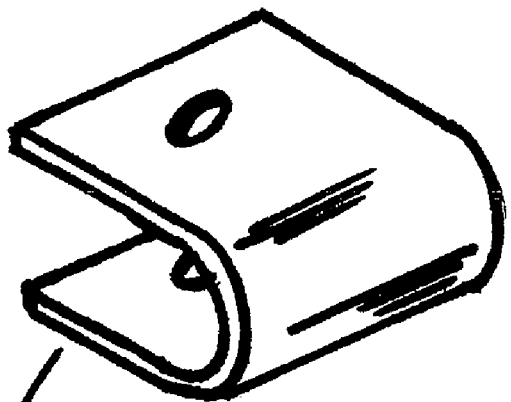
Figure 10F:
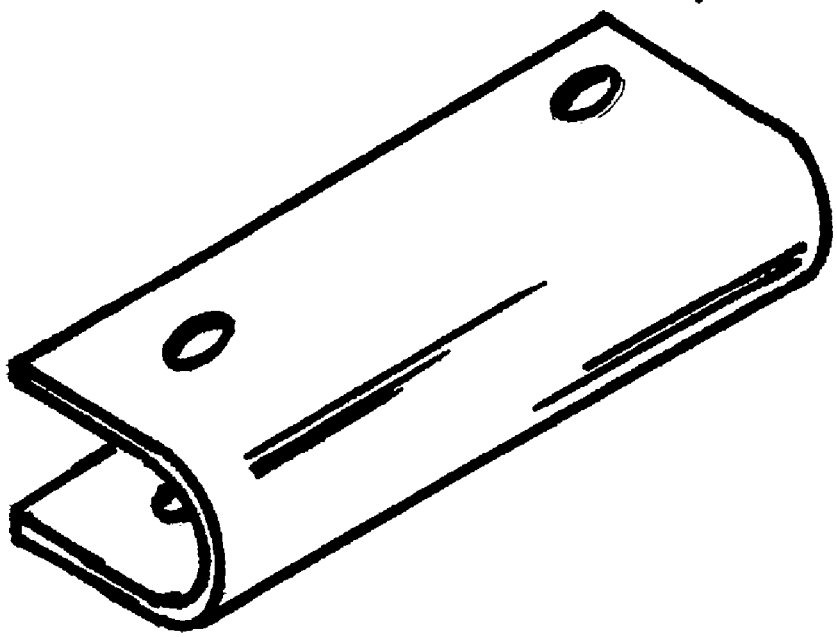
Figure 11A:
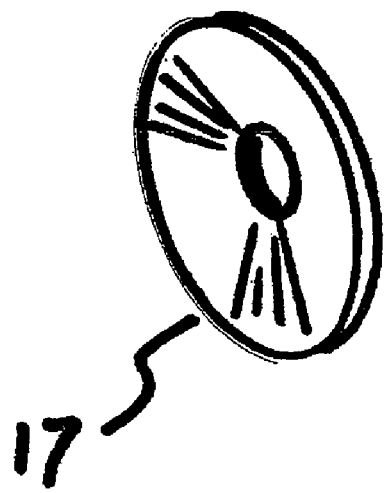
FIGS. 11A, 11B, 11C and 11D show alternative pressure plate designs in accordance with the present invention.
Figure 11B:
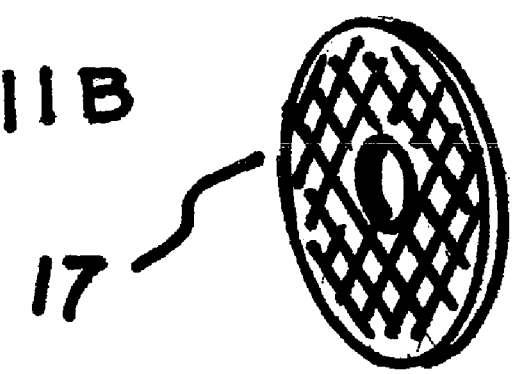
Figure 11C:
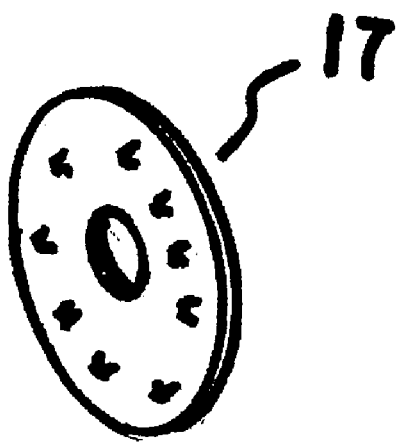
Figure 11D:
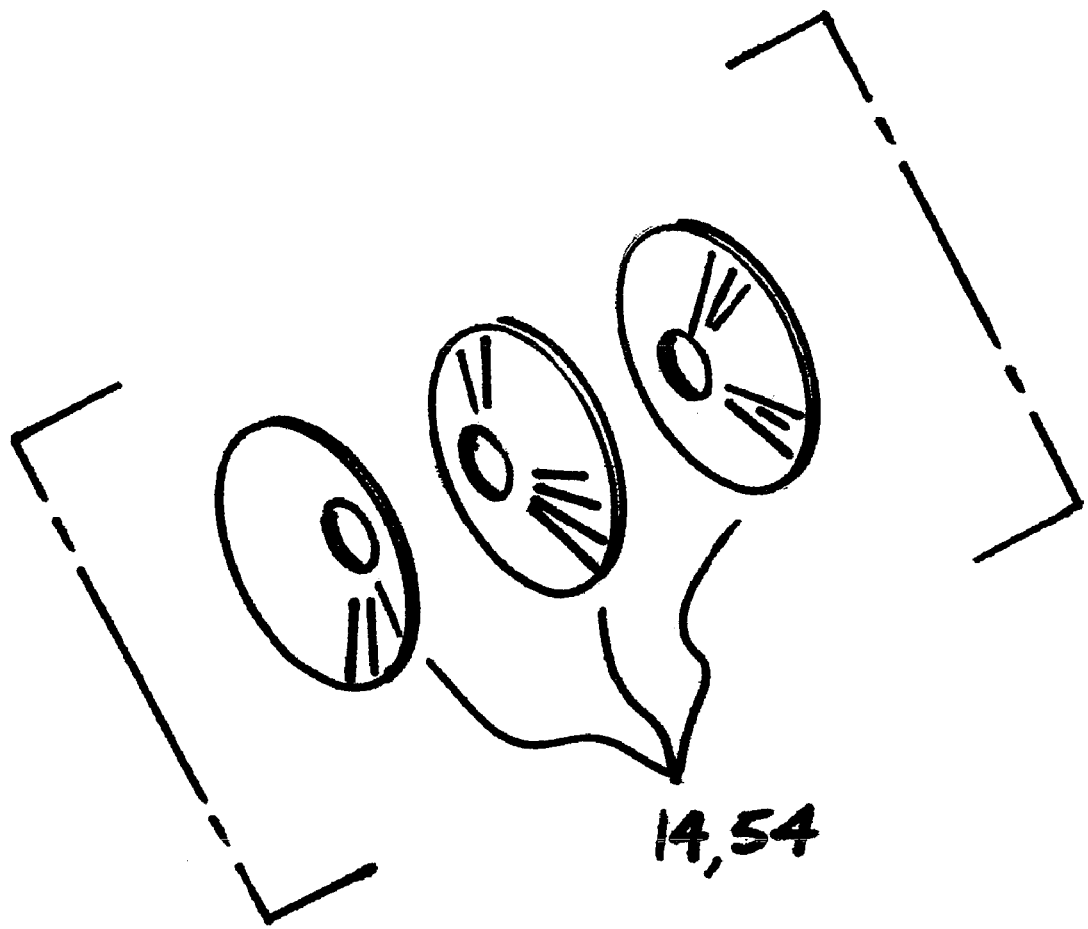
Figure 11E:
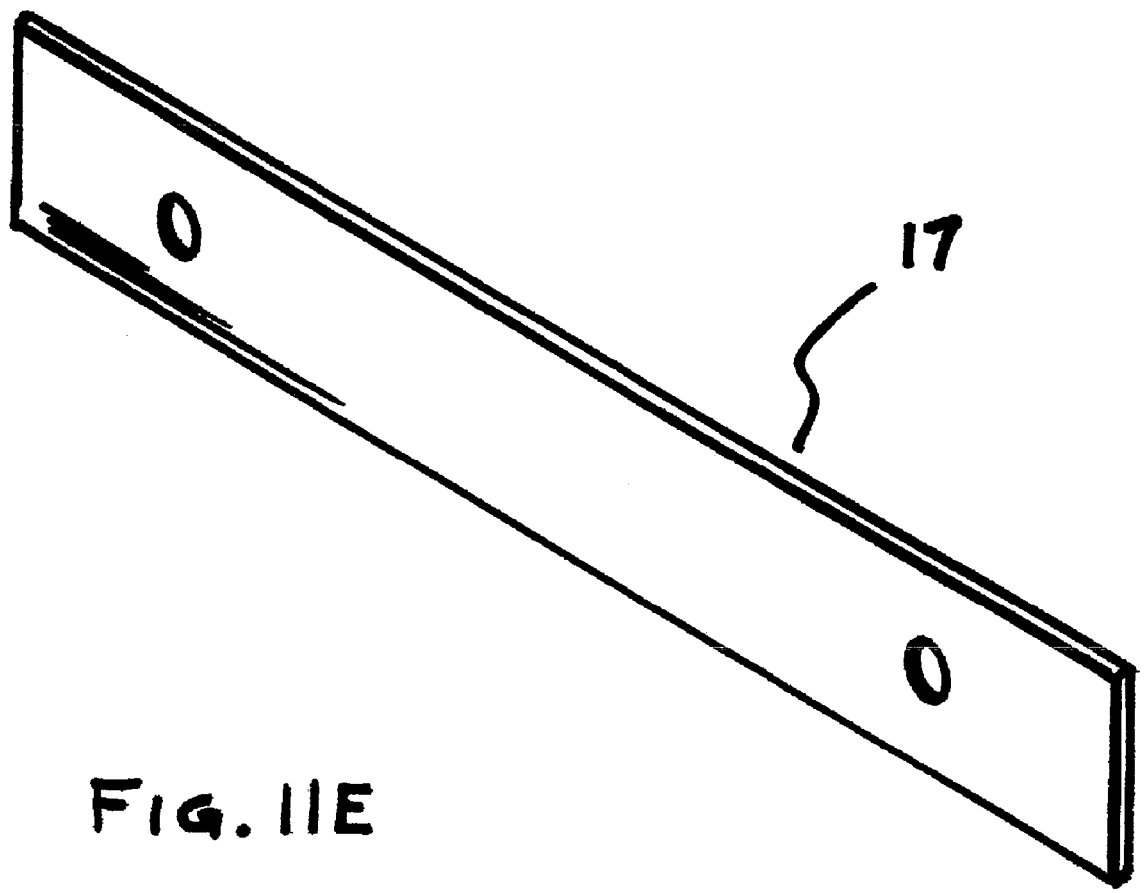
FIG. 11E shows alternative Belleville type spring member in accordance with the present invention.
Figure 12:
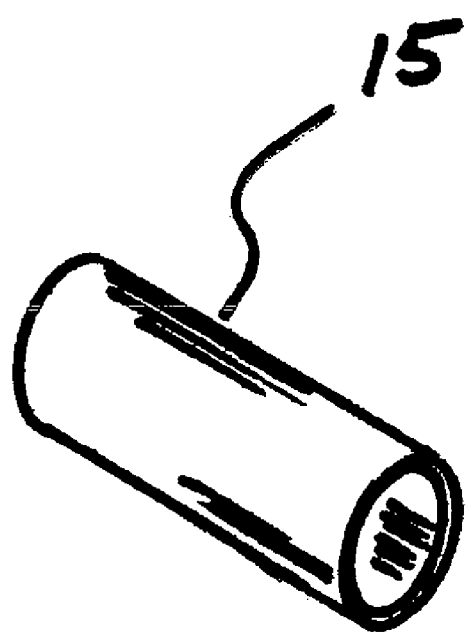
FIG. 12 shows a spacer member in accordance with the present invention.

Referring to FIGS. 4a and 4b, there is shown a mud flap mounting system 50 in accordance with another embodiment of the present invention. Mud flap mounting system 50 employs the same components as in the first embodiment with the exception of the mud flap and spring member. Referring to FIGS. 4 and 5, top edge 23 of mud flap 51 defines at least two mounting holes 59. Both mounting holes 59 include a bolt hole 60 and a slot 61 extending from top edge 23 and to its corresponding bolt hole 60. Slot 61 width approximates the diameter dimension of the mounting bolt. A stronger spring member 54 is required for this embodiment to provide the necessary clamping force to secure the mud flap in the service position. Threaded distal end 24 of bolt 12 extends through spacer 15 and pressure plate 17 and extends through bolt hole 60 in mud flap 51 and bracket hole 25 in mounting bracket 18 and washer 16. Tightening member 13 is threadedly received on the distal end 24 of bolt 12 to compress spring member 54 interposed between washer 16 and tightening member 13.

In operation, the dynamics of the releaseability function for the mud flap mounting system 50 provides that the force of spring members 54 holds mud flap 51 in a substantially flat vertical plane against the mounting bracket 18 during service. When mud flap 51 is pinched between a rotating tire 29 and a curb or other obstruction while backing up the vehicle, the extremely high instantaneous jerk on the mud flap 51 causes the mud flap 51 to be pulled past the bolts 12, which releases mud flap 51 from its mounting bracket. To remount mud flap 51, the tightening members 13 are loosened with tools to release spring member 54 pressure, allowing replacement of mud flap 51 on the mounting bracket 18. The tightening members 13 are then adjusted with tools to compress the spring members 14 to their originally or desired setting.

Referring to FIGS. 7A, 7B, 8A and 8B, there are shown two other typical applications of mud flap mounting system 10 in accordance with the present invention as applied to contemporary designs of mud flap mounting brackets 52 and 53. Note that spacer 15 extends through bracket hole 26 to contact pressure plate 17 in the applications shown.

Figure 13:
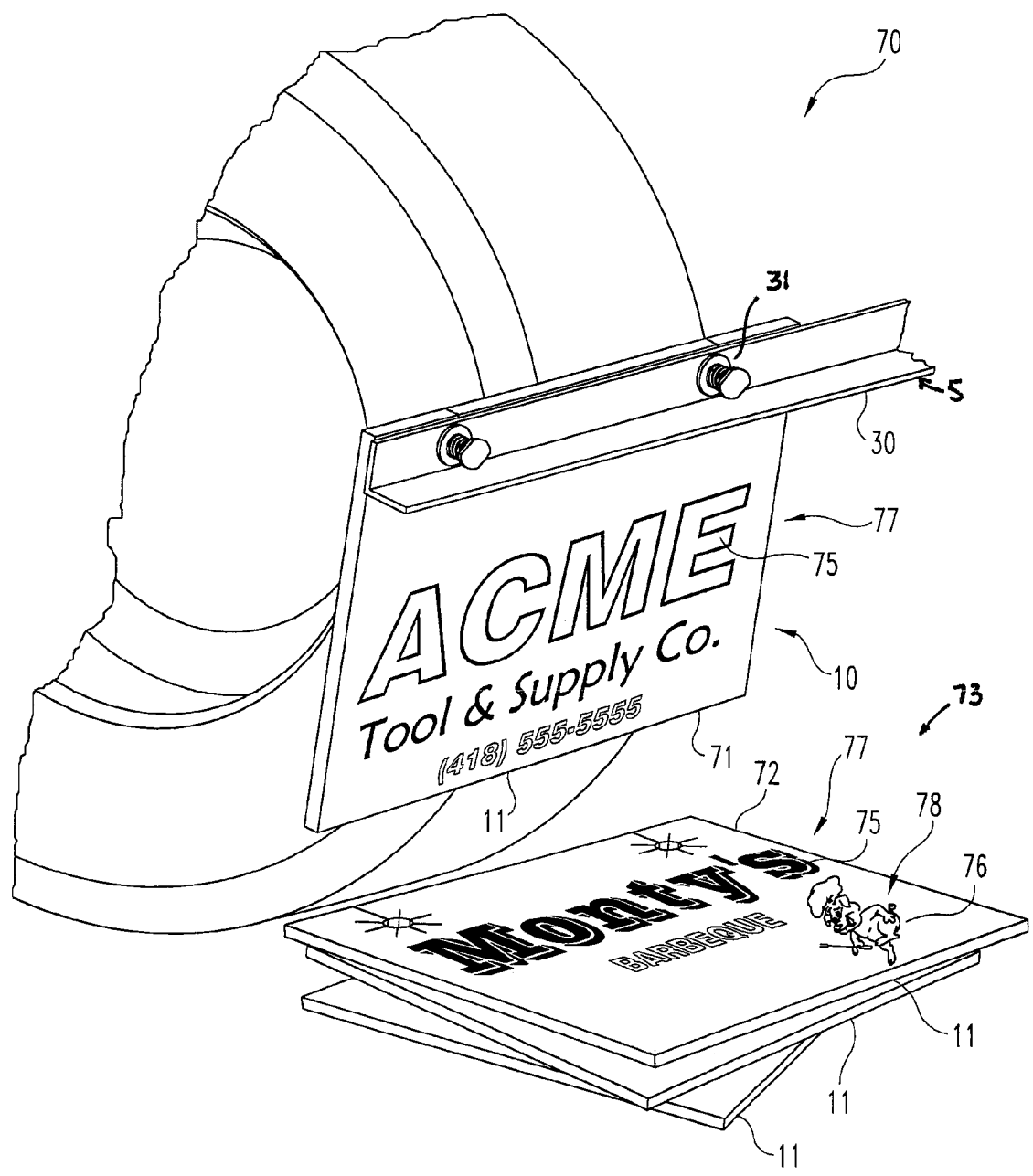
FIG. 13 is an isometric, exploded view of a mud flap mounting system 70 in accordance with another embodiment of the present invention.

Referring to FIG. 13, there is shown a mud flap system 70 in accordance with another embodiment of the patent invention. System 70 includes the mud flap mounting system 10 of FIG. 1, and comprises a mounting assembly 31, and wherein the mud flap 11 is a mud flap group 73. Mud flap group 73 comprises at least two mud flaps 71 and 72, each of which bears indicia 75 and/or an image 76. The indicia could be any desired message, such as and without limitation, an advertisement 77 for the vehicle owner or driver, or the owner of the semi-trailer or an associated third party. For example, and without limitation, such indicia could be a message such as, "WIDE LOAD" or "HOW'S MY DRIVING" or "HAPPY ST. PATRICK'S DAY" or an advertising message as shown in FIG. 13. The image 76 could be any desired image, such as and without limitation, a random or non-random design, a cartoon, or other image 78 associated with advertising 77. Such image could appear on the flap 11 by itself or with indicia (as in FIG. 13) The two or more flaps 71 and 72 could bear different indicia 75 and/or images 76 or the two or more flaps 71 and 72 could be identical.

Due to the configuration and dynamics of the releaseability function of mud flap mounting system 10, a particular flap 71 of mud flap system 70 could be pinched or pulled from its mounting bracket 30 with little or no damage occurring to flap 71. Owing to the ease of assembly and disassembly of the flap mounting assembly 31, if a flap 71 is forcibly detached from bracket 30 and vehicle 5, assembly 31 can be manually disassembled, and flap 71 can be quickly re-attached. If flap 71 is damaged at one of its bolt holes or elsewhere as a result of the forcible detachment or otherwise (or is simply dirty), a replacement flap 72 of mud flap system 70 can quickly be connected in its place, such replacement flap 72 here being identical to the damaged or dirty flap 71. Alternatively, the replacement flap 72 could bear different indicia 75 and/or images(s) 76. Alternatively, a user might choose to replace flap 71 with flap 72 simply to change the message appearing thereon. It is contemplated that the message or other indicia 75 and/or image(s) 76 would face rearwardly of the vehicle or trailer to which it is attached.

The mud flap group 73 of mud flap system 70 contemplates at least two flaps 11 (71 and 72 in FIG. 13) and may comprise as many flaps as desired. Mud flaps are typically black or a dark color to minimize noticeability of the dirt, cuts and other such wear and tear. However, because flaps 11 of mud flap system 70 can be so easily changed, one or more of the flaps 11 are contemplated to partially, if not entirely not be predominately black, dark gray or a similar dark color, such as and without limitation, yellow, blue, green, red, orange, or purple.

As discussed herein, the mud flap mounting system 70 (and the other mounting systems 10 and 50 and others) is for use in connection with one tire 29 (or tire group, on the left side of the vehicle, for example), and the mud flap group 73 for that tire 29 comprises two or more flaps. Alternative embodiments are contemplated wherein a mud flap group comprises three or more mud flaps for use with a pair of tires (e.g. the left and right tires or tire groups). Thus, two such flaps would be mounted, one each proximal to the two mating tires (left and right), and the third flap of the group would be the spare in case of a disconnection event, for example.

In another embodiment, one mud flap provider provides a mud flap mounting system 70 for a trucking entity whereby the entity purchases the mud flap system 70, which then comprises a mounting assembly 31 with sufficient hardware to connect (and easily reconnect) mud flaps 11 (71 and 72, for example) to its vehicles and also provides a plurality of mud flaps 11 (71 and 72, for example), which bear the desired indicia and/or images. Additional mud flaps 11 are provided by the provider, as needed. In another embodiment, a mud flap provider solicits from an advertiser a contract to advertise on mud flaps for X number of vehicles. The provider then contracts with one or more trucking companies or entities to use the flaps with the contracted advertising on X number of vehicles. The provider then completes the arrangement by making or having made flaps that bear the contracted advertising and providing the indicia and/or image bearing flaps (the mud flap group 73) and mounting assembly 31 to the company or entity for use as described.

Mud flap mounting system 70 permits a particular flap 71 to be wrenched from its connection to bracket 30 (a disconnection event) little or no damage occurring to the flap 71. Where a mud flap bears valuable advertising, a disconnection event would normally result in a destroyed and unusable flap. Flap 71 can instead easily be reattached, and the advertising carried thereon can continue to be displayed. This is particularly important where only a finite number of flaps 71 may be made (perhaps only a pair) carrying a particular ad message. Fewer flaps with a particular message can thus be made since the destruction thereof by a disconnection event is reduced, if not eliminated. A mud flap group may contain two or more flaps with different advertising. That is, one flap 71 (for one corresponding vehicle wheel) may carry an AL'S CHICKEN ad and the second flap 72 of the group may carry a JOE'S CHICKEN ad. Due to the ease of interchangeability, a driver can change one flap with another as she moves from one geographical area into another. Such advertising can thus more easily be sold on a regional basis for a truck that may often pass through multiple regions.

The easily interchangeable mud flap system 70 is contemplated to include flap mounting assembly 31 and flap 11 or any of the other flap mounting assemblies and/or flaps disclosed herein.

All alternate components shown in the drawing figures are identified with component reference numbers as indicated herein. The drawing figures are intentionally not shown in any particular scale.

While the invention has been illustrated and described in detail in the drawings and foregoing description, the same is to be considered as illustrated and not restrictive in character, it being understood that only the preferred embodiment has been shown and described and that all changes and modifications that come within the spirit of the invention are desired to be protected.

What is claimed is:

1. A mud flap mounting system for connecting a mud flap to a mud flap mounting bracket of a vehicle, comprising:
a mud flap group including at least two mud flaps, each comprising a sheet of flexible material having a top edge and defining at least two mounting openings, each mounting opening including a bolt hole, a first slit and at least a second slit, said first slit being a severed portion of the sheet with virtually no loss of material and extending from the top edge to the corresponding bolt hole, and the at least a second slit extending outwardly from the bolt hole;
for each bolt hole of said at least one mud flap group, one mud flap mounting assembly for connecting one of the mud flaps to a vehicle mud flap mounting bracket and including:
a pressure plate,
a spring member,
a bolt with a head and a shank with a distal end, the shank extending through the pressure plate, mud flap, bracket, and spring member, and
a tightening member engaged at the distal end of the shank to compress the pressure plate, mud flap, bracket and spring member between the bolt head and the tightening member; and,
wherein each mud flap of the mud flap group bears at least one of indicia and an image.

2. The mud flap mounting system for connecting a mud flap to a mud flap mounting bracket of a vehicle of claim 1 wherein the tightening member is a flanged nut.

3. The mud flap mounting system for connecting a mud flap to a mud flap mounting bracket of a vehicle of claim 1 wherein the spring member is a coil spring.

4. The mud flap mounting system for connecting a mud flap to a mud flap mounting bracket of a vehicle of claim 1 wherein vehicle mounting bracket defines at least two openings for receipt of mud flap mounting bolts, and wherein the bolt shank extends, in order, through the pressure plate, one of the bolt holes of one said mud flaps, a hole of the vehicle mounting bracket, the spring member and the tightening member.

5. The mud flap mounting system for connecting a mud flap to a mud flap mounting bracket of a vehicle of claim 1 further including a spacer interposed between the head of the bolt and the pressure plate.

6. The mud flap mounting system for connecting a mud flap to a mud flap mounting bracket of a vehicle of claim 5 wherein the tightening member is a flanged nut, the spring member is a flanged nut and the spring member is a coil spring.

7. A mud flap mounting system for connecting a mud flap to a mud flap mounting bracket of a vehicle, comprising:
at least one mud flap group including at least two mud flaps, each comprising a sheet of flexible material having a top edge and defining at least two mounting openings, each mounting opening defining a bolt hole, a first slit and at least a second slit, said first slit being a severed portion of the sheet with virtually no loss of material and extending from the top edge to the corresponding bolt hole, and the at least a second slit extending outwardly from the bolt hole;
for each bolt hole of said at least one mud flap group, one mud flap mounting assembly for connecting one of the mud flaps to a vehicle mud flap mounting bracket and including:
a pressure plate,
a spring member,
a bolt with a head and a shank with a distal end, the shank extending through the pressure plate, mud flap, bracket, and spring member, and
a tightening member engaged at the distal end of the shank to compress the pressure plate, mud flap, bracket and spring member between the bolt head and the tightening member; and,
wherein each mud flap of the mud flap group bears at least one of indicia and an image.

8. The mud flap mounting system for connecting a mud flap to a mud flap mounting bracket of a vehicle of claim 7 wherein the tightening member is a flanged nut.

9. The mud flap mounting system for connecting a mud flap to a mud flap mounting bracket of a vehicle of claim 7 wherein the spring member is a coil spring.

10. The mud flap mounting system for connecting a mud flap to a mud flap mounting bracket of a vehicle of claim 7 wherein vehicle mounting bracket defines at least two openings for receipt of mud flap mounting bolts, and wherein the bolt shank extends, in order, through the pressure plate, one of the bolt holes of one said mud flaps, a hole of the vehicle mounting bracket, the spring member and the tightening member.

11. The mud flap mounting system for connecting a mud flap to a mud flap mounting bracket of a vehicle of claim 7 further including a spacer interposed between the head of the bolt and the pressure plate.

12. The mud flap mounting system for connecting a mud flap to a mud flap mounting bracket of a vehicle of claim 11 wherein the tightening member is a flanged nut, the spring member is a flanged nut and the spring member is a coil spring.

13. The mud flap mounting system for connecting a mud flap to a mud flap mounting bracket of a vehicle of claim 7 wherein at least one of the at least two mud flaps defines a first slit being a severed portion of the sheet with virtually no loss of material and extending from the top edge to the corresponding bolt hole.

14. A method for mounting a mud flap to a mud flap mounting bracket of a vehicle, the vehicle mounting bracket defining at least two openings for receipt of mud flap mounting bolts, the method comprising the steps of:
providing a mud flap mounting system for connecting a mud flap to the mud flap mounting bracket of the vehicle, comprising:
at least one mud flap group including at least two mud flaps, each comprising a sheet of flexible material having a top edge and defining at least two mounting openings, each mounting opening defining a bolt hole, a first slit and at least a second slit, said first slit being a severed portion of the sheet with virtually no loss of material and extending from the top edge to the corresponding bolt hole, and the at least a second slit extending outwardly from the bolt hole;
for each bolt hole of said at least one mud flap group, one mud flap mounting assembly for connecting one of the mud flaps to the vehicle mud flap mounting bracket and including a pressure plate, a spring member, a bolt with a head and a shank with a distal end, and a tightening member engageable at the distal end of the shank to compress the pressure plate, mud flap, bracket and spring member between the bolt head and the tightening member; and, wherein each mud flap of the mud flap group bears at least one of indicia and an image;

positioning one of the at least two mud flaps against the vehicle mounting bracket so that the bolt holes of the at least two mounting openings are aligned with the at least two openings of the vehicle mounting bracket;

for each bolt hole, extending the bolt shank of a bolt through one pressure plate, one bolt hole, one aligned opening of the vehicle mounting bracket, and one spring member; and, for each bolt hole, applying the tightening member to the distal end of the shank to compress the pressure plate, mud flap, bracket and spring member between the bolt head and the tightening member.

15. The method for mounting a mud flap to a mud flap mounting bracket of a vehicle of claim 14 further including the step of changing the mud flap by:

for each bolt hole, untwisting the tightening member from the distal end of the bolt;

removing the bolt from the one pressure plate, one bolt hole, one aligned opening of the vehicle mounting bracket, and one spring member;

removing said one of the at least two mud flaps from against the vehicle mounting bracket;

positioning the another of the at least two mud flaps against the vehicle mounting bracket so that the bolt holes of the at least two mounting openings are aligned with the at least two openings of the vehicle mounting bracket;

for each bolt hole, extending the bolt shank of a bolt through one pressure plate, one bolt hole, one aligned opening of the vehicle mounting bracket, and one spring member; and, for each bolt hole, applying the tightening member to the distal end of the shank to compress the pressure plate, mud flap, bracket and spring member between the bolt head and the tightening member.

* * * * *